Jan. 25, 1944. N. HERZMARK Re. 22,424

ENGINE STARTING DEVICE

Original Filed Feb. 4, 1931 2 Sheets-Sheet 1

INVENTOR
NICOLAS HERZMARK.
BY Paul M. Klein
ATTORNEY

Jan. 25, 1944. N. HERZMARK Re. 22,424

ENGINE STARTING DEVICE

Original Filed Feb. 4, 1931 2 Sheets-Sheet 2

INVENTOR

NICOLAS HERZMARK.

BY Paul M. Klein

ATTORNEY

Reissued Jan. 25, 1944

Re. 22,424

UNITED STATES PATENT OFFICE 22,424

ENGINE STARTING DEVICE

Nicolas Herzmark, New York, N. Y.

Original No. 2,035,161, dated March 24, 1936, Serial No. 513,437, February 4, 1931. Application for reissue November 4, 1943, Serial No. 508,975. In France February 4, 1930

12 Claims. (Cl. 121—37)

This invention relates to starting devices for internal combustion engines.

One of the objects of the invention is to provide an engine starter of the fluid pressure type embodying novel means for producing engagement with and cranking of a member of the engine to be started.

A further object of the invention is to provide in a starting device of the foregoing character, novel means for converting an axially directed pressure into a rotation producing force whereby the axial movement of the driving member is translated to the engine cranking member.

A further object of the invention is to provide a novel starting mechanism of the type employing a plurality of power actuated piston members one of which operates to produce engagement between the starting mechanism and a member of the engine to be started and the other of which operates to impart a cranking torque to the engine engaging member.

Another object of the invention is to provide a piston driven starting mechanism of the foregoing character which makes it possible, by the use of a novel construction, to obtain a greater number of cranking turns of the starting mechanism without increasing the power stroke of the piston beyond that heretofore employed.

Another object of the invention is to provide a novel construction in a piston driven starting mechanism by the use of which it is possible to reduce the size and bulk of such a mechanism or for the same size to increase the maximum number of turns which the starter can make in a single starting operation.

Another object of this invention is the provision of a starting device for engines, employing a cylinder attachable to an engine and having a pair of, what may be termed, outer and inner coacting piston-and-sleeve units of substantially equal overall effective pressure areas, but of different displacement, operative in the cylinder, each of the units comprising a piston having at least one threaded sleeve, the pistons of both units having substantially equal pressure areas, the sleeve threads of one unit having a pitch opposite to the sleeve threads of the other unit, whereby a combined rotary and longitudinal movement is imparted to each of the units, when the pistons are operated, the combined movement of one unit being in opposite direction to that of the other unit, and wherein the inner unit is provided with a clutch element for engaging a corresponding clutch element of an engine to be started, and wherein means are provided for normally urging the pistons of the units into adjacent relation with one another, and wherein other means are provided for limiting the movement of the clutch-equipped unit into the cylinder to facilitate the positioning of the pistons of both units for locating the inlet from a pressure source.

Another object of the present invention is to provide in a pressure-operated starting device means for altering the effective pressure area of its working parts, to, for instance, reduce such pressure area for effecting a gentle engine-engaging movement of one unit; to employ the full piston area for an initial starting torque action; and to finally augment the piston area by rendering available the entire structure of the units as additional effective pressure area, for increasing the torque power of the device.

Another object of the present invention, as indicated above, is to provide yieldable resistance-producing means in engagement with the sleeve or sleeves of the outer unit for initially retarding or restricting the movement of that unit until the clutch element of the inner unit is in secure engagement with the clutch element of the engine, said yieldable resistance-reducing or movement restraining means being so constructed and arranged as to prevent the movement of the outer unit, after the engagement of the inner unit with the engine, until a sufficient amount of pressure is built up between the pistons of both units to overcome the resistance of that yieldable restraining means, and at that moment to forcibly move the outer unit in outward direction.

Another object of the present invention, as above indicated, is the provision of stop means for the sleeve of the outer unit, adapted to not only limit the outward movement of that unit, for preventing its piston coming into forcible contact with the cylinder end, but also to maintain both units in their operative interengagement and, at the same time, to limit their relative movement when their pistons are in their extreme, separated position, and to facilitate the movement of both units together as one body, while their pistons are in their extreme, distanced position, in the direction away from the engine, due to the inertia of the outer unit, imparted thereto during its outward movement, in order to automatically disengage the clutch element of the inner unit from the engine, preparatory to the next operating cycle of the device, such bodily outward movement of both units together coming to a relatively gentle termination, when the inner unit comes in contact with its stop means arranged at the cylinder end nearest to the engine.

Another object of the invention is to provide a novel arrangement of the component parts of the starter, which novel arrangement permits the interior parts to be readily withdrawn from the casing with a view to their inspection or replacement without it being necessary to disconnect the pipes or other parts leading to the starter.

Another object of the invention is to provide in a piston driven starter of the character above described, a novel construction whereby the piston or pistons are automatically positioned at the end of the starting operation in the proper location for most effective application of power at the beginning of the next engine starting operation.

Other objects and advantages to be derived from the use of the invention reside in the specific construction, combination and inter-relation of parts whereby a compact, efficient, and easily operated and maintained unit is produced, all of which objects and advantages will appear more clearly upon an inspection of the following specification, with reference to the accompanying drawings illustrating three embodiments of the invention. It is to be expressly understood, however, that the said drawings are for the purpose of illustration only and are not to be construed as a definition of the limits of the invention, reference being had to the appended claims for this purpose.

In the drawings wherein like reference characters refer to like parts throughout the several views.

Figure 1:
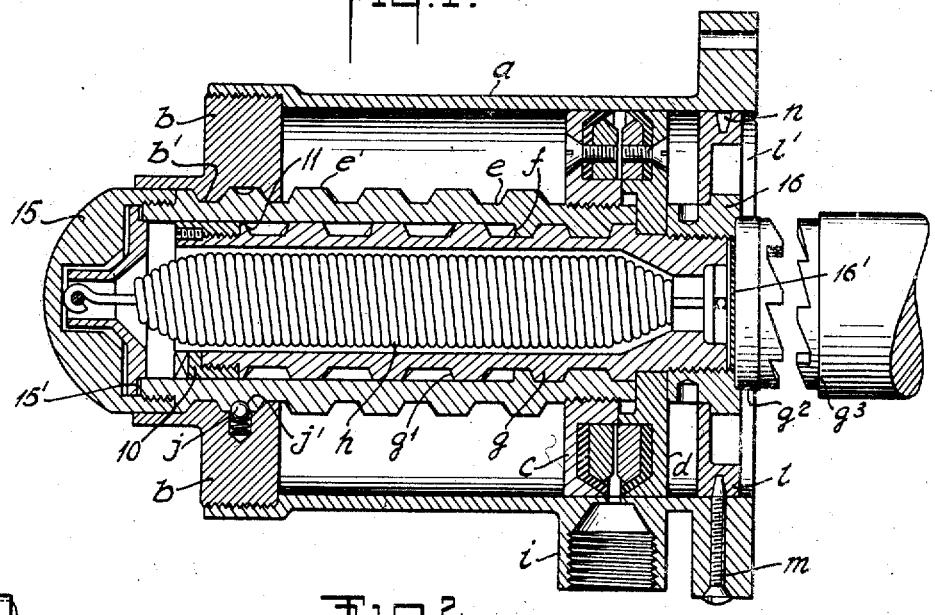
Fig. 1 is a longitudinal axial section through a device embodying the invention.

Referring to Fig. 1, the starting mechanism constituting the embodiment of the invention therein shown comprises a casing *a* fixed by any suitable means upon the frame work or crank case of the engine to be started, the said casing being provided at its front end with an annular member *b* of which the interior surface $b^1$ is screw-threaded. In the interior of the casing *a*, which forms the fixed cylinder to which the air is admitted, are two pistons *c* and *d*. The piston *c*, which is the driving piston, is fast with a socket or sleeve *e*, the exterior surface $e^1$ of which is screw-threaded in such a manner as to be able to screw through the annular member *b* forming a quick-pitch nut. The other end of the sleeve *e* is also provided on its interior face with a nut *f*.

Means preferably employed for producing initial engagement with a member of the engine to be started comprises a second piston *d*, which is displaceable through only a limited stroke, is fixed upon an inner socket or sleeve *g*, also screw-threaded on its exterior surface $g^1$, and adapted to screw through the nut *f*. The sleeve *g* is also fitted with a coupling member $g^2$ having ratchet jaws and coming into engagement, at the time of starting, with the corresponding member $g^3$ keyed upon the shaft of the motor to be started.

Means are provided for returning the pistons *c* and *d* after the operative stroke of the starter in order to restore the parts to position for the next operation. As shown in Fig. 1, the preferred means for producing such return operation comprises the use of a tension spring *h*, connecting the inner end of the sleeve *g* with the outer end of the sleeve *e*. A pipe connection *i* leading to the compressed air supply line is designed to admit the compressed air into the cylinder at a point between the two pistons *c* and *d*. A number of balls *j* are spring-pushed against the cup-seatings $j^1$ formed on the exterior surface of the sleeve *e*, so that this sleeve and consequently the piston *c*, experiences a certain resistance to their axial displacement at the beginning of such movement.

The working of the arrangement is as follows:

When compressed air is admitted between the pistons *c* and *d* by the operation of a suitable cock or valve, the piston *d*, which is entirely free, is displaced; the sleeve *g*, with which it is fast, screws through the nut *f* which for the moment is stationary. The jaw coupling $g^2$ comes into engagement with the coupling $g^3$, and the piston *d* is therepon stopped.

Under the force derived from the compressed air acting on the piston *c*, the balls *j* are now pushed back out of the cups $j^1$, and the piston *c* moves axially whilst revolving as the sleeve *e* screws through the nut formed by the member *b*. At the same time, the nut *f*, fast with the travelling and revolving sleeve *e*, causes the screw-threaded sleeve *g* to turn, which consequently imparts a movement of rotation to the coupling members $g^2$ and $g^3$ and thence to the motor shaft.

It will be seen that when the sleeve *e* has made one complete turn and has consequently advanced one screw-pitch, the interior sleeve *g* has also performed one complete revolution relatively to the sleeve *e* and therefore has made two complete turns relatively to the fixed part *b*. This obviously on condition that the screw threads of the two sleeves *e* and *g* are of equal pitch but of opposite hand or direction.

The result of this arrangement is that the number of turns of the central sleeves *g* and therefore of the shaft to be started, is double that which would be obtained with a single screw-threaded sleeve.

Attention is invited to the end construction of sleeve *g* at the outer end thereof, which is provided with a reinforcing nut 10, screwed against an annulus 11, the latter serving as stop or abutment for the straight end edge of nut *f* of sleeve *e*.

When piston *c* of the outer piston-and-sleeve unit is forced to its extreme outward position, it is prevented from coming into forcible contact with end plate *b* of the cylinder, since the engagement of annulus 11 by nut *f* stops piston *c* short of the end plate. These stop means also serve for keeping the sleeves of the two units in operative interengagement with each other, while their pistons are in their extreme separated position, and spring *h* is forcibly expanded to a maximum, so that when the pressure separating the pistons ceases, the force of spring *h* will cause the reversal of the reciprocal combined rotary and longitudinal sleeve movement, and return the pistons to their normal, adjacent position shown.

Another important function of the aforesaid stop means for the two units is to prevent their movement relative to each other, while they are in their expanded position, due to the maximum separation of their pistons. In that position of the units, the latter are forced to move together as one body in respect to the cylinder in outward direction, away from the engine, due to the inertia imparted to the outer unit during its outward movement, thereby automatically effecting the disengagement of clutch element $g^2$ of the inner unit from clutch element $g^3$ of the engine, until this bodily movement of the expanded unit assembly is stopped relatively gently when the clutch end of the inner unit comes into an abutting position with cylinder head l. Such relatively gentle stop movement is due to the fact that the inertia of the outer unit is spent, after the disengagement of clutch element $g^2$ from clutch element $g^3$ is effected.

In order to provide for dismounting the starter without having to disconnect the compressed air pipes, the inner cylinder head l of the starter is fixed to the cylinder barrel $a$ by screws or the like $m$ entering a groove $n$, and the outer end or annular member $b$ is screwed into the said barrel. Consequently, when it is desired to withdraw from the barrel or casing all the members of the starter, it is sufficient to unscrew the screws $m$ and the annular member $b$.

Figure 2:
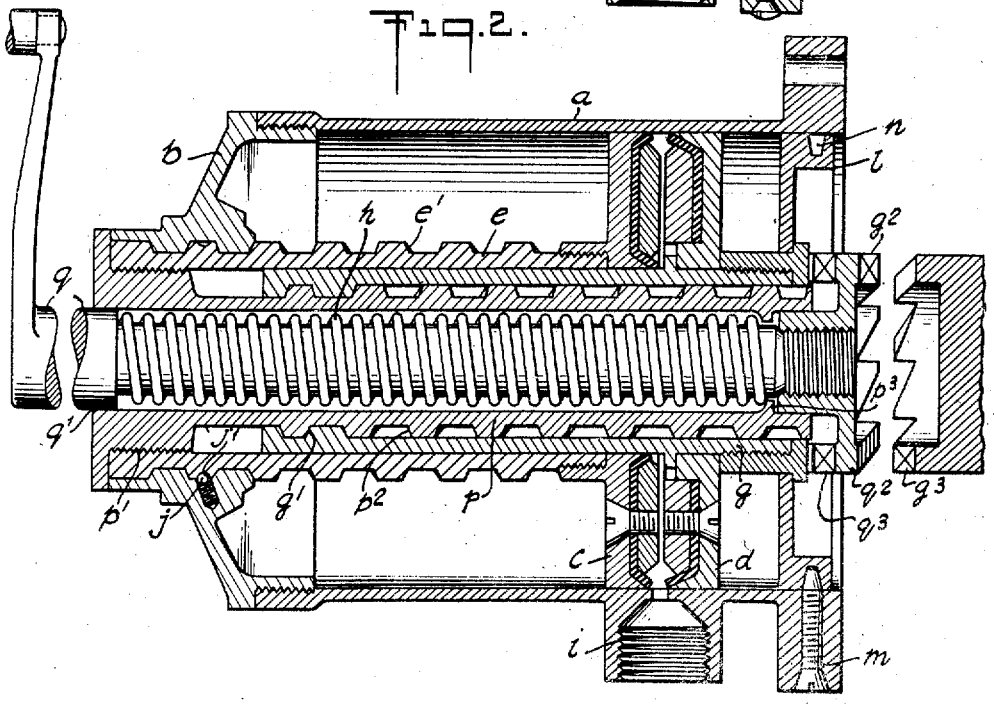
Fig. 2 is a similar sectional view of a second embodiment of the invention.

In the form of construction shown in Figure 2, the exterior sleeve $e$ fast with the piston $c$ is also made fast with a central sleeve $p$ by means of a screw thread $p^1$. The sleeve $p$ is provided with a screw thread $p^2$ upon its external surface. The piston $d$ is fast with an intermediate sleeve $g$ provided with a nut $g^1$, in which is engaged the thread $p^2$ of the sleeve $p$.

The spring $h$ is formed as a compression spring fitted between a fixed collar $q^1$ on the shaft $q$ and an abutment $p^3$ on the interior of the central sleeve $p$. Upon the shaft $q$ is mounted a double-jaw-clutch member $q^2$ which at rest is held in engagement with a jaw-clutch member $q^3$ fast with the intermediate sleeve $g$.

This starter works in the following manner: Compressed air being admitted between the two pistons $c$ and $d$, the piston $d$ is the first to move, carrying with it the sleeve $g$, which rotates together with the piston, screwing along the thread $p^2$. The shaft $q$ is also rotated by the intermediary of the engaged jaw-clutch members $q^2$ and $q^3$, and after a limited movement of the shaft $q$ the jaws $g^2$ come into contact with the jaw clutch member $g^3$ on the motor shaft.

From this moment, the balls $j$ are pushed back out of their recesses $j^1$ and the piston $c$ begins to travel; the exterior sleeve $e$ screws through the fixed nut $b$ and as a result the central sleeve $p$ fast with the exterior one is also rotated, whilst moving axially. In consequence, the sleeve $g$ provided with the nut $g^1$ revolves further, making two revolutions while the connected sleeves $e$ $p$ make one complete revolution, on the assumption obviously that the screw threads of the sleeves $e$ and $p$ are of equal pitch but of opposite hand.

When the rotation of the motor shaft by the jaw clutches $q^2$ and $g^3$ is completed, the whole is brought back to the initial position by the spring $h$.

To start up the motor by hand, the pressure exerted manually on the shaft $q$, whilst turning, has for effect to separate the jaw-clutch members $q^2$ and $g^3$ and to bring into engagement the jaws $g^2$ and $g^3$. The starting then takes place as usual.

The dismounting of the starter is effected in the same manner as that which has been described for the starter illustrated in Figure 1.

In the embodiment illustrated in Figure 2 there are also provided stop means for limiting the outward movement of the outer piston-and-sleeve unit, and serve similar purposes to the stop means described in connection with Figure 1.

In this second embodiment of my invention, the stop means are composed of three elements, that is, abutment $p^3$ provided for spring $h$ in sleeve $p$, the spring $h$ itself and fixed collar $q^1$ of cranking shaft $q$.

When the pistons of the units are in their extreme separated position, spring $h$ is forcibly compressed between abutment $p^3$ and collar $q^1$, whereby the movement of the units relative to one another is prevented, as is their disengagement from each other. The thus fixedly held units are now forced to move together as one body within the cylinder in the direction away from clutch element $g^3$ of the engine, due to the inertia of the outer unit, until clutch element $g^2$ becomes disengaged from engine clutch element $g^3$, and its outward movement is gently stopped by inner cylinder head L.

At that moment, the piston-and-sleeve units are brought back to their normal position by the expansion of spring $h$, and the pistons of the unit assume their normal adjacent relation to each other, the units being ready for the next starting operation.

Figure 3:
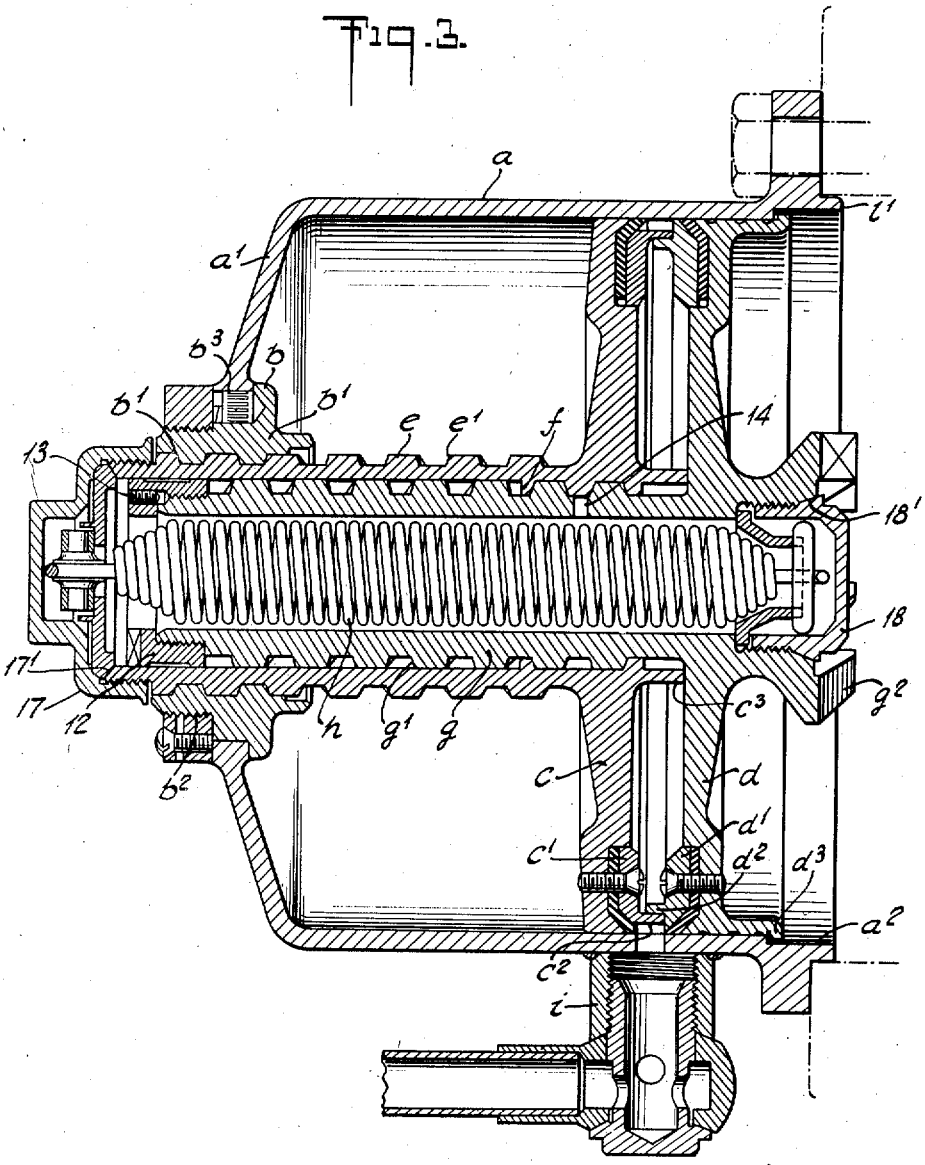
Fig. 3 is a similar sectional view of a third embodiment of the invention.

In the embodiment shown in Fig. 3, the casing $a$ is provided with two pistons $c$ $d$ and an annular member $b$ forming a nut for the screwed sleeve $e$, and a nut $f$ for the screwed sleeve $g$ which nut is integral with the revoluble sleeve $e$. The two sleeves $e$ $g$ with screw-threads $e^1$ $g^1$ are shown integral with the respective pistons $c$ $d$, and the nut $b^1$ is secured in the centre of a dished outer end $a^1$ of the casing $a$, by means of a nut $b^2$, dowel pins $b^3$ being spaced around the periphery of the nut to anchor it to the casing. The pistons $c$ $d$ are fitted with packing leathers or similar elastic members, as in the aforesaid prior specification, and the rings $c^1$ $d^1$ holding the packing in position are formed with concentric flanges $c^2$ $d^2$ which enter telescopically one within the other in the position illustrated. The rings $c^1$ $d^1$ are secured in position upon the packing leathers by means, for example, of screws entering the pistons.

In this embodiment the air or gas under pressure admitted by way of the connection $i$, has only the narrow outer annular areas of the pistons upon which to act until the flanges $c^2$ $d^2$ are separated by the initial movement of the piston $d$. The engagement of the coupling member $g^2$ with the corresponding member on the motor shaft therefore takes place gently and without damage to the coupling jaws.

In the device illustrated in Figure 3, there are also provided stop means for limiting the outward movement of the outer piston-and-sleeve unit $c$, $e$, in respect to the inner piston-and-sleeve unit $d$, $g$. These stop means comprise the straight end face of nut $f$ and the corresponding end face of an internally threaded ring 12, in engagement with the outer end of sleeve $g$, the ring being held against movement by screw 13.

When nut $f$ comes into contact with ring 12, the movement of the outer unit terminates, before piston $c$ can progress toward cylinder end $a'$. At that moment the units are in their extreme extended position, and their pistons are also separated to their limit.

In that position both units are movable only jointly within the cylinder, and, due to the inertia of the outer unit, the extended unit bodies will move in outward direction and away from the engine to be cranked, until their movement is stopped, when lip $d^3$ of piston $d$ abuts with the step provided in counterbore $a^2$. This outward movement disengages clutch element $g^2$ of the inner unit from the engine shaft, and prepares the device for a new starting operation.

The piston $d$ is formed with a lip $d^3$ travelling in a counterbore $a^2$ at the rear end of the casing, so as to limit the axial movement of the piston $d$. The piston $c$ is also shown provided with a concentric flange $c^3$ which abuts against the pinion $d$ in the normal position shown, under the tension of the spring $h$ connecting the opposite ends of the screw-threaded sleeves.

By the provision of the stop lip $d^3$, limiting the inward movement of piston $d$, the normal position of the latter is defined. Flange $c^3$ of piston $c$ functions as spacer for the two pistons $c$ and $d$, and spring $h$ normally urges them into adjacent position with each other. This normal position of the two pistons fixes the location of inlet $i$ for admitting compressed air or gas simultaneously against the adjacent faces of both pistons.

The sleeves $e$ $g$ are formed with screw threads $e^1$ $g^1$ of equal pitch but of opposite hand, so that the rotary movement imparted to the coupling member $g^2$ is double that of the exterior sleeve $e$ and piston $c$.

The initial movement of piston $d$ for effecting a gentle engagement of coupling element $g^2$ with the corresponding coupling element of an engine shaft takes place while piston $c$ is yieldably restrained against movement by the action of spring-actuated balls $j$, such as illustrated in Figures 1 and 2 against its sleeve $e$.

When clutch element $g^2$ has fully and safely engaged the corresponding clutch element of the engine shaft, the outward movement of piston $d$ toward the engine stops, while the outward movement of piston $c$ commences, when the force of the restraining means bearing against sleeve $e$ is overcome by the pressure increase between pistons $c$ and $d$.

As the pistons, during the initial operating period of the device, are forced to separate to a distance at which the telescoping flanges $c^2$ and $d^2$ become disengaged from each other, the effective pressure area materially increases far beyond the former annular peripheral, initial area restricted by flanges $c^2$ and $d^2$, in that the full pressure area of the pistons becomes available. In consequence of this sudden increase in the pressure area, a forceful torque action is imparted to the inner piston-and-sleeve unit $d$, $g$ through the operation of the outer piston-and-sleeve unit $c$, $e$.

This torque action becomes still further augmented by an additional increase in the effective pressure area of the two piston-and-sleeve units, by utilizing all available surfaces of their interior structures. The employment of these interior structure surfaces is effected through the provision of communicating ducts 14 in sleeve $g$, which ducts are adapted to become exposed when piston $c$ has moved in outward direction sufficiently to clear them. At that moment communication is established between the space defined by the two pistons and the interior structure of the units, whereby all available interior areas automatically become effective pressure areas, in addition to the effective pressure areas of the pistons. The thus gained power accelerates the outward movement of the outer unit.

The above described provision of communicating ducts for effecting the utilization of all available surfaces in both units as effective pressure areas, applies not only to the embodiment disclosed in Figure 3, but to the devices shown in Figures 1 and 2 as well; and in this connection it will be observed that in all three forms of my invention the interior structure parts of the units are positively sealed at their ends and are rendered pressure-tight for that express purpose by tightly fitting end closures, such as the thread-engaged end closures shown in Fig. 1 at 15 and 16, provided with gaskets 15' and 16' respectively, or the tightly fitted interengaged end parts shown in Fig. 2, or the thread-engaged closing elements with tapered sealing seats illustrated in Fig. 3 at 17, 17' and 18, 18'.

It is to be noted in all embodiments illustrated, that the movement of the units toward their respective ends of the cylinder must not be impeded in any way, such as by air trapped between the pistons and the cylinder heads. For this purpose I either construct the starter cylinder with open ends, in the manner shown at right in Figure 3, or, when cylinder heads are employed, I provide breather openings in the latter. The provision of breather openings being obvious, they are not illustrated.

The invention is not limited to the forms of construction which have been described but can be carried out with all modifications based on the same principle, the arrangement comprising more than two screws, if desired. Such a starter can likewise be combined with an air compressor mounted on the same axis and driven by the motor shaft. For this purpose, the rear end of the starter casing or cylinder barrel, as shown in the drawings, is provided with a centering portion or register $l^1$ in which the extremity of the compressor casing can be located in alignment with the starter and the motor shaft.

In stead of compressed air to separate the pistons, gas under pressure may be employed, and such gas may be obtained from a storage tank or directly from an explosion (such as that of a cartridge) conveyed into the inlet $i$.

Likewise other changes which will now suggest themselves to those skilled in the art may be made in the form, details of construction and arrangement of the parts without departing from the scope of the invention as disclosed herein, and reference is therefore to be had to the appended claims for a definition of such scope.

What is claimed is:

1. In a starting device for engines or the like, a cylinder, a pair of combination inner and outer piston-and-sleeve units of substantially equal pressure areas operative in the cylinder, each unit being composed of a piston and at least one threaded sleeve, the sleeves of the two units being adapted to impart to the units combined rotary and longitudinal movements in opposite directions, means for urging the pistons of the units to a normally adjacent position to one another, a stop for limiting the movement of the inner piston-and-sleeve unit into the cylinder, whereby the pistons of both units are caused, while in their adjacent position, to become normally spaced from their respective cylinder ends, means for yieldably restraining the movement of one of the units, such as the outer unit, while the other unit, such as the inner unit, is first actuated, the inner unit being provided with engine engaging means, means leading to the ends of the pistons at the place of their normal, adjacent position, for introducing pressure simultaneously against the adjacent faces of both pistons to effect their separation, and stop means provided to the units for limiting such separation.

2. In a starting device as set forth in claim 1, said stop means being provided on the sleeves of the units and serving to not only limit the movement of the units in respect to each other, but to prevent their disengagement when the pistons assume their most distanced position from one another, and to cause the units with their thus spaced pistons to move together as one body in respect to the cylinder in the direction away from the engine, due to the inertia of the outer unit's movement in that direction, thereby causing an automatic disengagement of the inner unit from the engine, preparatory to the next operating cycle of the device.

3. In a starting device as set forth in claim 1, a sleeve of at least one of the units having communicating means to facilitate, after a partial separating movement of the pistons, the employment of the interior parts of both units as effective pressure area, in addition to their piston area.

4. In a starting device as set forth in claim 1, the pistons having means for initially restricting the normal pressure area of the pistons, until they have moved apart sufficiently to fully expose that normal pressure area, said restricted area serving to first effect a gentle movement of the inner unit for its engagement with an engine shaft, while the outer unit is held against movement by said restraining means, prior to the application of a sufficient amount of pressure against the full effective pressure area of the pistons for effecting a forceful engine starting torque movement of the inner unit, by way of the outer unit; and means for augmenting the effective pressure area of both units, after the pressure application for the starting torque movement, and means for limiting the outward movement of the outer unit in respect to the inner unit, thereby causing a simultaneous outward movement of both units and the resulting disengagement of the inner unit from the engine.

5. In a pressure operated engine starter, two coacting piston-and-sleeve units operative in a cylinder, the sleeves of the units having means for imparting to them combined rotary and longitudinal movements in opposite directions, one of the units having engine engaging means and stop means for limiting its movement into the cylinder, yieldable restraining means for the other unit to delay its operation, while the first unit is caused to engage the engine, until sufficient pressure is built up between the units to overcome the force of said restraining means and to actuate said other unit, and therethrough said first unit; a plurality of means provided with the units for altering their effective pressure area, one of the means serving for first decreasing the latter for the gentle engine engagement by the first unit, and other means serving for later successively augmenting said area for first actuating the other unit, and then increasing its operating force; and means for causing the simultaneous movement of both units together in respect to the cylinder for automatically disengaging the first unit from the engine, preparatory to the next operating cycle of the device.

6. In a pressure operated engine starter, two interengaged, coacting piston-and-threaded-sleeve units having substantially equal effective pressure areas and being operative in a cylinder, and having means for first reducing and other means for subsequently augmenting the normal effective pressure area of the pistons, each of the units comprising one-piece body structures, one of the units having engine engaging means and stop means for limiting its movement into the cylinder, means for admitting a fluid pressure medium between said units to effect their separation and to cause engagement of the engine engaging means of said one unit with an engine, the sleeve threads of one unit having a pitch opposite to the sleeve threads of the other unit to impart to the units combined rotary and longitudinal movements in opposite directions, means for normally urging the pistons of the units toward each other, said one unit, in engaging an engine, being adapted to rotate in one direction and to move towards said engine and away from said other unit, said other unit, when actuated, being adapted to rotate in opposite direction and to move away from both said one unit and from the engine, and, by its movement, to render available the full effective pressure area, and thus to impart to said one unit an increased rotation in that one direction for starting the engine, and means provided on the units for causing them, after completing the engine-starting operation, to move together as one body in the direction away from the engine, for automatically disengaging said one unit from the latter.

7. In a starter for an engine having a starting jaw; a piston coaxial with said jaw; a cylinder cooperating with the piston, said cylinder constituting a permanent installed part of said engine; an end plate slidable throughout the length of the cylinder and adapted to normally close one end thereof; fastening means for normally securing the end plate in fixed position adjacent one end of said cylinder and operable to permit removal of said end plate; a starter jaw automatically engageable with the engine jaw; a second end plate adapted to normally close the other end of the cylinder; fastening means for normally securing the second end plate to said cylinder and operable to permit removal of said end plate; and means for imposing several turns on the starter jaw from a single stroke of the piston, said last named means including a sleeve driven by said piston and threadedly engaging said second named end plate; said piston, sleeve and end plates being removable through one end of said cylinder without disturbing the position of the cylinder with respect to the engines on which said cylinder is mounted.

8. A starter comprising a cylinder, a piston mounted to reciprocate therein, an axially movable and rotatable shaft extending through the cylinder and terminating in a clutch element engageable with a member of the engine to be started, helical members adapted to drivably connect said piston and clutch element, and a spring compressible between a shoulder on said shaft and an abutment on one of said helical members for returning said piston to its initial position.

9. A starter comprising a cylinder; an apertured end plate adapted to normally close one end thereof; fastening means for normally securing the end plate in fixed position adjacent one end of said cylinder and operable to permit removal of said end plate; a piston mounted to reciprocate in said cylinder; an axially movable and rotatable shaft extending through the apertured end plate and into the cylinder and adapted to convert the axial movement of said piston into a rotary cranking action applied to a member of the engine to be started; helical means adapted to drivingly connect said piston and said shaft, said helical means including an externally threaded sleeve movable axially with said piston and rotarily with said shaft; cooperating threads on the inner surface of the aperture in the end plate and cooperating with the externally threaded sleeve; means for mounting said cylinder permanently in position on the engine prior to installing said piston and sleeve therein, said piston, sleeve, and end plate being insertable within said cylinder as a unit after the permanent installation of said cylinder; a second end plate slidable throughout the length of the cylinder and adapted to normally close the other end of said cylinder; fastening means for normally securing said second named end plate in fixed position and operable to permit removal of said end plate when it is desired to remove the piston, sleeve and end plates from the cylinder.

10. In a device of the class described, in combination, an axially movable driving member, a driven member, a pair of concentric screw-threaded sleeves having screw-threads of opposite hand, said sleeves being rotatable in response to axial movement of said driving member, and an intermediate sleeve for transmitting the rotary movement of said first named sleeves to said driven member.

11. In a device of the class described, a substantially cylindrical casing, a piston movable axially of said casing, a sleeve movable axially of said casing and connected to said piston to be driven thereby, said piston and sleeve being readily removable through an end of said casing, means for introducing fluid under pressure into said casing to move said piston and sleeve therein, said means including a part formed on the exterior of said casing for attachment of a fluid conducting member, a closure plate for each end of said cylindrical casing, and said closure plates being relatively disposed so that both may be withdrawn with the piston and sleeve from one end of said cylindrical casing without disconnecting said fluid conducting member; engaging and cooperating threads on said sleeve and on one of said closure plates to cause rotation of said sleeve as it moves axially of the casing, a clutch element engageable with a member of the engine to be started, and means connecting the sleeve and clutch element to effect rotation of said clutch element by the rotation of said sleeve.

12. An engine starter comprising a fixed cylindrical casing; a stationary apertured closure member at one end of said casing, the walls defining said aperture being threaded; a pair of opposed pistons reciprocable within said casing; means for introducing fluid under pressure between the pistons to move the pistons in opposite directions; an outer sleeve within said cylindrical casing having an external thread adapted to engage the thread of the stationary apertured closure member and to be rotated thereby, said sleeve being directly connected to one of said pistons and being protrusible in part from said casing through the apertured closure member; a second sleeve within the outer sleeve and connected to said outer sleeve to move therewith, said second sleeve being externally threaded; a third sleeve intermediate said outer and second named sleeves and being externally threaded to engage the threads of said second named sleeve and to be rotated thereby, said third named sleeve being secured directly to the other of said pistons; and a clutch element secured to one end of said third named sleeve and engageable with a clutch element of the engine to be started, whereby the rotation of said outer and second named sleeves is imparted to the third named sleeve and to the engine.

NICOLAS HERZMARK.